UNITED STATES PATENT OFFICE.

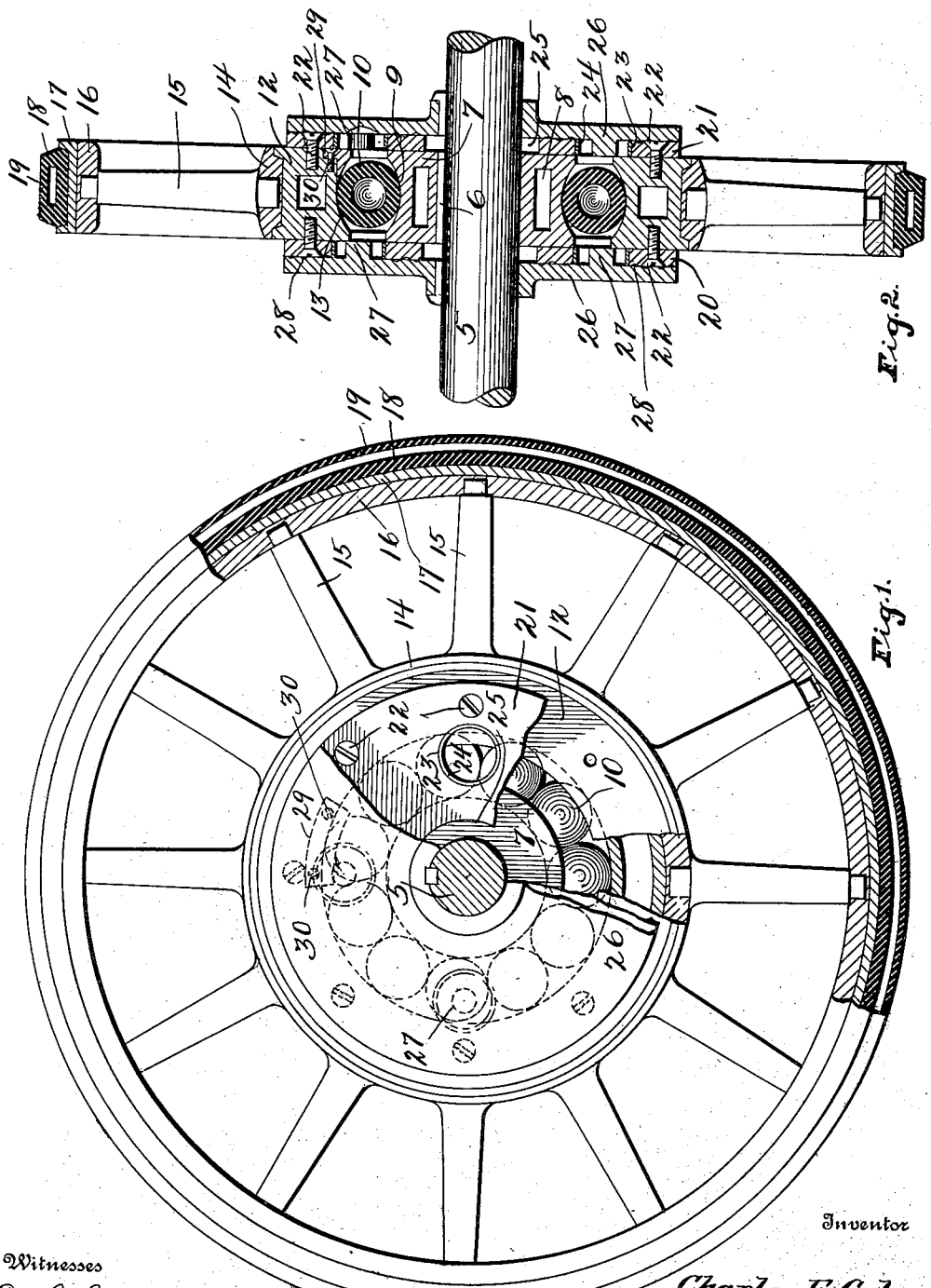

CHARLES E. COLE, OF CLEVELAND, OHIO.

VEHICLE-WHEEL.

No. 873,841.     Specification of Letters Patent.     Patented Dec. 17, 1907.

Application filed December 26, 1906. Serial No. 349,423.

*To all whom it may concern:*

Be it known that I, CHARLES E. COLE, citizen of the United States, residing at Cleveland, in the county of Cuyahoga and State of Ohio, have invented certain new and useful Improvements in Vehicle-Wheels, of which the following is a specification.

My invention relates to vehicle wheels and has for its object the provision of a device of this character constructed in such manner that any jar or shock incident to traveling over rough roads, will be absorbed by cushioning elements carried by the hub of the wheel.

A further object of the invention is the provision of a wheel constructed in the manner above set forth and also constructed in such manner that a minimum of chafing or friction will be imparted to the cushioning members of the hub.

A further object of the invention is the provision of a vehicle wheel, the outer portion of which will be vertically movable with relation to the hub and shaft by which it is carried, together with cushioning elements located between said parts and means for securely bracing the parts of the wheel against lateral movement with relation to each other when the vehicle to which the wheel is applied is going around a curve at a high rate of speed.

Further objects and advantages of the invention will be set forth in the detailed description which now follows.

In the accompanying drawing: Figure 1 is a view partly in side elevation and partly in section of a vehicle wheel constructed in accordance with the invention, and, Fig. 2 is a vertical section of said wheel.

Like numerals designate corresponding parts in both of the figures of the drawing.

Referring to the drawing, the numeral 5 designates a shaft to which rotation may be imparted from a motor of any character. Keyed to this shaft as at 6 is a ring 7 which is preferably made hollow as at 8 to lighten the structure. This ring has an annular channel formed in its outer periphery as at 9, said channel forming a run-way for hollow rubber cushioning balls 10. A second ring 12 having an annular channel 13 formed in the inner periphery thereof, surrounds these balls and bears upon them. The rings 7 and 12 are preferably made of metal, although any desired substance may be used for this purpose. A preferably wooden ring 14 surrounds the ring 12 and is adapted to receive the inner ends of spokes 15, the outer ends of said spokes being secured to the felly 16 of the wheel. This felly is surrounded by a metallic tire 17 which in turn retains in position a cushion rubber tire 18, the working surface 19 of said tire being preferably flat to thereby give increased tractive power to the wheel and to more effectually prevent skidding when the vehicle is rounding curves.

Plates 20 and 21 are secured to the ring 12 by screws 22. These plates are provided with a series of openings 23, said openings being lined with hardened steel bushings 24. Openings 25 are formed through these plates through which the shaft 5 passes, said openings being considerably larger in diameter than said shaft. Plates 26 are provided upon their inner faces with studs or lugs 27 which enter the openings 23 and bear against the steel bushings 24. As is best illustrated in Fig. 2, the plates 20 and 26 bear against each other at one side of the wheel and the plates 21 and 26 bear against each other at the opposite side of the wheel. To reduce the friction between these plates, they are bored out as at 28 and graphite or like solid lubricant is placed in these recesses.

A portion of the ring 12 indicated at 29, is made separate from the rest of the ring and is secured in position by screws 30, by virtue of which construction it is possible to remove this section when it is desired to either insert or remove the balls 10, thereby greatly facilitating such operation.

The operation of the device is as follows: Rotation being imparted to the shaft 5, a like movement is imparted to the plates 26. The rotation of these plates in turn, imparts rotation to the plates 20 and 21 through the engagement of the studs 27 with the openings 23. Since the plates 20 and 21 are secured to the ring 12, it follows that a like rotation will be imparted to said ring and since the ring 7 is keyed to the shaft, it follows that rotation will also be imparted to this ring. It will therefore be seen that there is no appreciable rotation of the rings 12 and 7 with relation to each other, but that all of the friction, chafing or wear that will be brought to bear upon the balls 10, will be due to the vertical movement of the ring 12 with relation to the ring 7 and this vertical movement will not tend to wear out these balls very fast. Rotation of the ring 12 will of course through the spokes 15, impart movement to the felly 16, tire 17 and tire 18.

Since the studs 27 enter openings considerably larger than themselves, it follows that when the wheel passes over an obstruction, the ring 12 may move upwardly for a slight distance with relation to the ring 7, the shock incident to the passage of the wheel over said obstruction being absorbed by the balls 10. Of course a certain amount of this shock will first be absorbed by the rubber cushioning tire 19.

Since the channels 9 and 13 are formed upon a greater radius than the radius of the periphery of the balls 10, sufficient space is left in which these balls may expand.

From the foregoing description, it will be seen that a wheel constructed in accordance with the present invention, will be one of great strength and durability while still being simple in construction. No pneumatic tubes or air sacks are required to be inflated in this construction and an oilless hub is provided. The principal cushioning elements viz., the balls 10, are located within the hub of the wheel where they are protected instead of being exposed to the wear of the road-bed as is usually the case.

While the elements shown and described are well adapted to serve the purposes for which they are intended, it is, however, to be understood that the invention is not limited to the precise construction set forth, but includes within its purview such changes as may be made within the scope of the appended claims.

What I claim, is:

1. In a vehicle wheel, the combination with a pair of annular outer plates, of a shaft to which said plates are secured, a ring also secured to said shaft, said ring having a concaved outer periphery, a second ring surrounding the first named ring, said second ring having a concaved inner periphery, hollow rubber cushioning balls located between said rings, and plates secured to the outer ring which overlap the inner ring and which are entirely covered by the outer plates, openings formed in the plates that are carried by the outer ring, and projections carried by the outer plates which extend into said openings, said openings being larger than said projections.

2. In a vehicle wheel, the combination with a pair of annular outer plates, of a shaft to which said plates are secured, a ring also secured to said shaft, said ring having a concaved outer periphery, a second ring surrounding the first named ring, said second ring having a concaved inner periphery, hollow rubber cushioning balls located between said rings, and plates secured to the outer ring which overlap the inner ring and which are entirely covered by the outer plates, openings formed in the plates that are carried by the outer ring, and projections carried by the outer plates which extend into said openings, said openings being larger than said projections, one of said rings having a removable section which when removed permits the removal of the balls.

In testimony whereof I affix my signature in presence of two witnesses.

CHARLES E. COLE.

Witnesses:
N. A. MARCHAND,
ROBERT WAY, Jr.